(12) United States Patent
Heley

(10) Patent No.: US 7,191,889 B1
(45) Date of Patent: Mar. 20, 2007

(54) REMOTE CONTROLLED SWING AUGER SYSTEM

(76) Inventor: Kenneth J. Heley, 8895 160th Ave. SE., Lidgerwood, ND (US) 58053

( * ) Notice: Subject to any disclaimer, the term of this patent is extended or adjusted under 35 U.S.C. 154(b) by 166 days.

(21) Appl. No.: 11/012,426

(22) Filed: Dec. 14, 2004

(51) Int. Cl.
*B65G 21/10* (2006.01)

(52) U.S. Cl. ............... 198/315; 198/301; 198/314; 198/317; 198/318; 198/667

(58) Field of Classification Search .......... 198/300, 198/301, 313, 314, 315, 317, 318, 666, 667
See application file for complete search history.

(56) References Cited

U.S. PATENT DOCUMENTS

| | | | | |
|---|---|---|---|---|
| 3,842,714 | A | | 10/1974 | Coleman ............... 91/459 |
| 4,332,261 | A | | 6/1982 | Webster ............... 130/27 |
| 4,455,922 | A | | 6/1984 | Brelsford et al. ......... 91/358 |
| 4,459,079 | A | | 7/1984 | Brelsford et al. ......... 414/505 |
| 4,596,424 | A | | 6/1986 | Wilcos, Jr. et al. ......... 299/64 |
| 4,603,775 | A | * | 8/1986 | Plett ............... 198/589 |
| 4,742,938 | A | | 5/1988 | Niewold ............... 222/381 |
| 4,989,716 | A | * | 2/1991 | Stuckey ............... 198/311 |
| 5,099,986 | A | * | 3/1992 | Kuzub ............... 198/666 |
| 5,129,502 | A | * | 7/1992 | Justice ............... 198/303 |
| 5,184,715 | A | * | 2/1993 | Feterl ............... 198/667 |
| 5,305,866 | A | * | 4/1994 | Stewart et al. ......... 198/311 |
| 5,343,995 | A | | 9/1994 | Scarrow ............... 198/311 |
| 5,351,805 | A | * | 10/1994 | Miller et al. ......... 198/493 |
| 5,431,523 | A | | 7/1995 | Ferguson ............... 414/525.9 |
| 5,492,217 | A | * | 2/1996 | Stewart ............... 198/667 |
| 5,718,556 | A | | 2/1998 | Forsyth ............... 414/503 |
| 5,746,303 | A | | 5/1998 | Niewold ............... 198/660 |
| 5,785,481 | A | | 7/1998 | Ockels ............... 414/523 |
| 5,888,044 | A | | 3/1999 | Baskerville ............. 414/523 |
| 6,068,103 | A | * | 5/2000 | Werner ............... 198/311 |
| 6,120,233 | A | | 9/2000 | Adam ............... 414/502 |
| 6,296,435 | B1 | | 10/2001 | Wood et al. ............ 414/523 |
| 6,325,588 | B1 | | 12/2001 | Nolin ............... 414/526 |
| 6,497,546 | B2 | | 12/2002 | Wood et al. ............ 414/523 |
| 6,722,489 | B1 | | 4/2004 | Cook ............... 198/608 |

OTHER PUBLICATIONS

Swing-Away Portable Augers Hutchinson Brochure 3 Pages.

\* cited by examiner

*Primary Examiner*—Joe Dillon, Jr.

(57) ABSTRACT

A remote controlled swing auger system for efficiently manipulating a position of a swing auger. The remote controlled swing auger system includes a swing auger connectable to a main auger, a swing hopper connected to the swing auger, a plurality of front wheels and a plurality of rear wheels rotatably attached to the swing hopper, a drive motor mechanically connected to the front wheels, a control unit in communication with the drive motor, and at least one controller in communication with the control unit. The controller may be comprised of a manual controller and/or a remote controller. The user is able to pivot the swing hopper with respect to a main auger by using the remote controller while in the tractor or in a remote location away from the augers.

20 Claims, 10 Drawing Sheets

REMOTE CONTROLLED SWING AUGER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to swing augers and more specifically it relates to a remote controlled swing auger system for efficiently manipulating a position of a swing auger.

2. Description of the Related Art

Swing augers have been in use for years. Conventional swing augers are attachable to main auger which is well known in the art. One of the main problems with conventional swing augers is that they are heavy and difficult to manually manipulate.

Recently, hydraulically powered swing augers such as the MK POWER SWING manufactured by WESTFIELD in Rosenort, Manitoba utilize hydraulic power from the tractor to drive auxiliary wheels added to the swing auger. One of the problems with the hydraulically powered swing augers is that they require the tractor to be in operation to provide hydraulic pressure to the hydraulic motor. Another problem with hydraulically powered swing augers is that they require the user to manipulate a valve near the swing auger requiring the user to leave the tractor to move the swing auger.

While these devices may be suitable for the particular purpose to which they address, they are not as suitable for efficiently manipulating a position of a swing auger. Conventional swing augers require the user to manually manipulate the swing auger into the desired positions.

In these respects, the remote controlled swing auger system according to the present invention substantially departs from the conventional concepts and designs of the prior art, and in so doing provides an apparatus primarily developed for the purpose of efficiently manipulating a position of a swing auger.

BRIEF SUMMARY OF THE INVENTION

In view of the foregoing disadvantages inherent in the known types of swing augers now present in the prior art, the present invention provides a new remote controlled swing auger system construction wherein the same can be utilized for efficiently manipulating a position of a swing auger.

The general purpose of the present invention, which will be described subsequently in greater detail, is to provide a new remote controlled swing auger system that has many of the advantages of the swing augers mentioned heretofore and many novel features that result in a new remote controlled swing auger system which is not anticipated, rendered obvious, suggested, or even implied by any of the prior art swing augers, either alone or in any combination thereof.

To attain this, the present invention generally comprises a swing auger connectable to a main auger, a swing hopper connected to the swing auger, a plurality of front wheels and a plurality of rear wheels rotatably attached to the swing hopper, a drive motor mechanically connected to the front wheels, a control unit in communication with the drive motor, and at least one controller in communication with the control unit. The controller may be comprised of a manual controller and/or a remote controller. The user is able to pivot the swing hopper with respect to a main auger by using the remote controller while in the tractor or in a remote location away from the augers.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a remote controlled swing auger system that will overcome the shortcomings of the prior art devices.

A second object is to provide a remote controlled swing auger system for efficiently manipulating a position of a swing auger with respect to a semi hopper trailer or other trailer.

Another object is to provide a remote controlled swing auger system that does not require manual manipulation of a swing auger.

An additional object is to provide a remote controlled swing auger system that may be utilized upon various types of main augers.

A further object is to provide a remote controlled swing auger system that can be operated remotely from a tractor or other safe location.

Another object is to provide a remote controlled swing auger system that efficiently unloads grain and other particulate material from a trailer.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
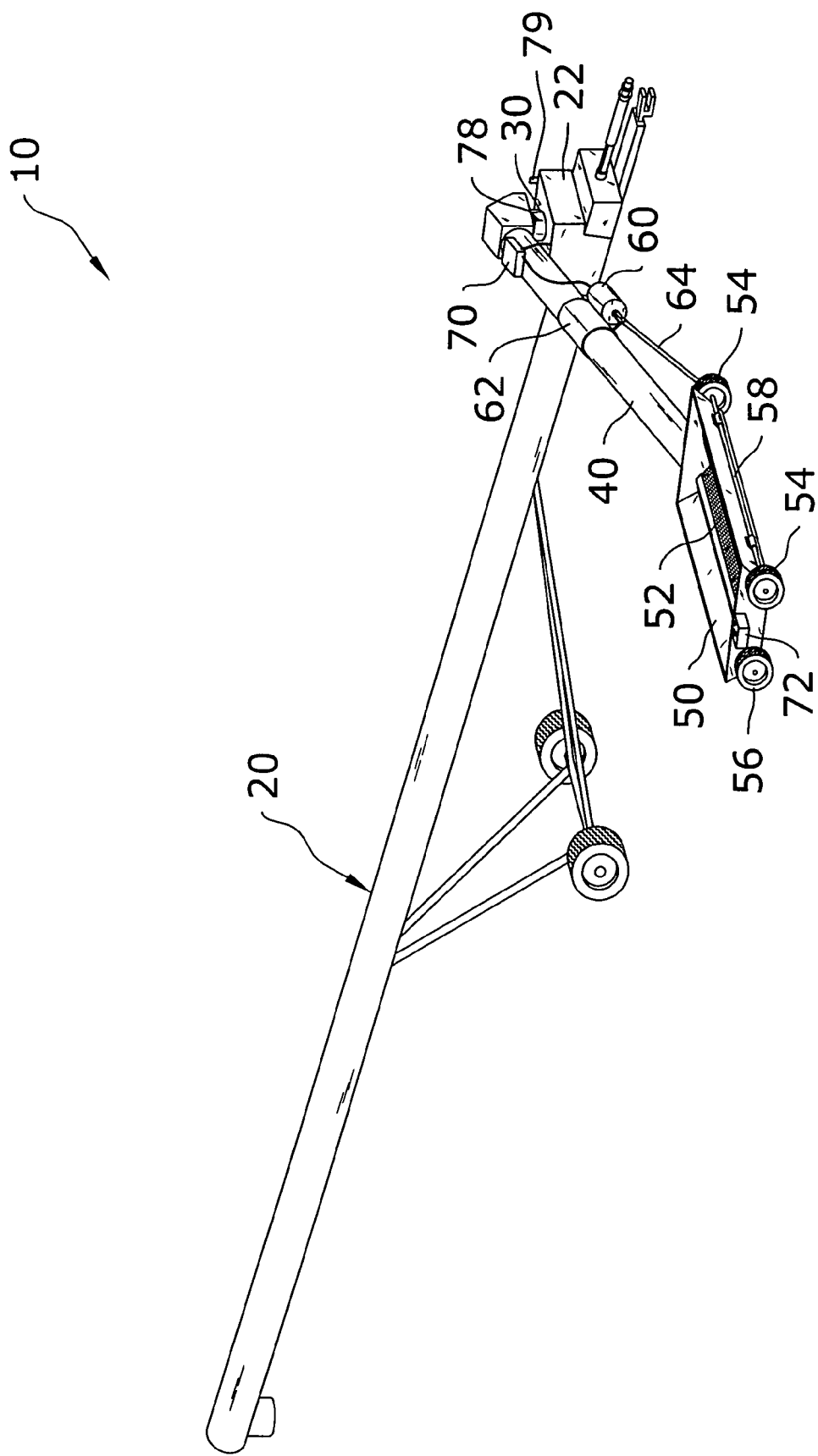
FIG. 1 is an upper perspective view of the present invention attached to a main auger.
Figure 2:
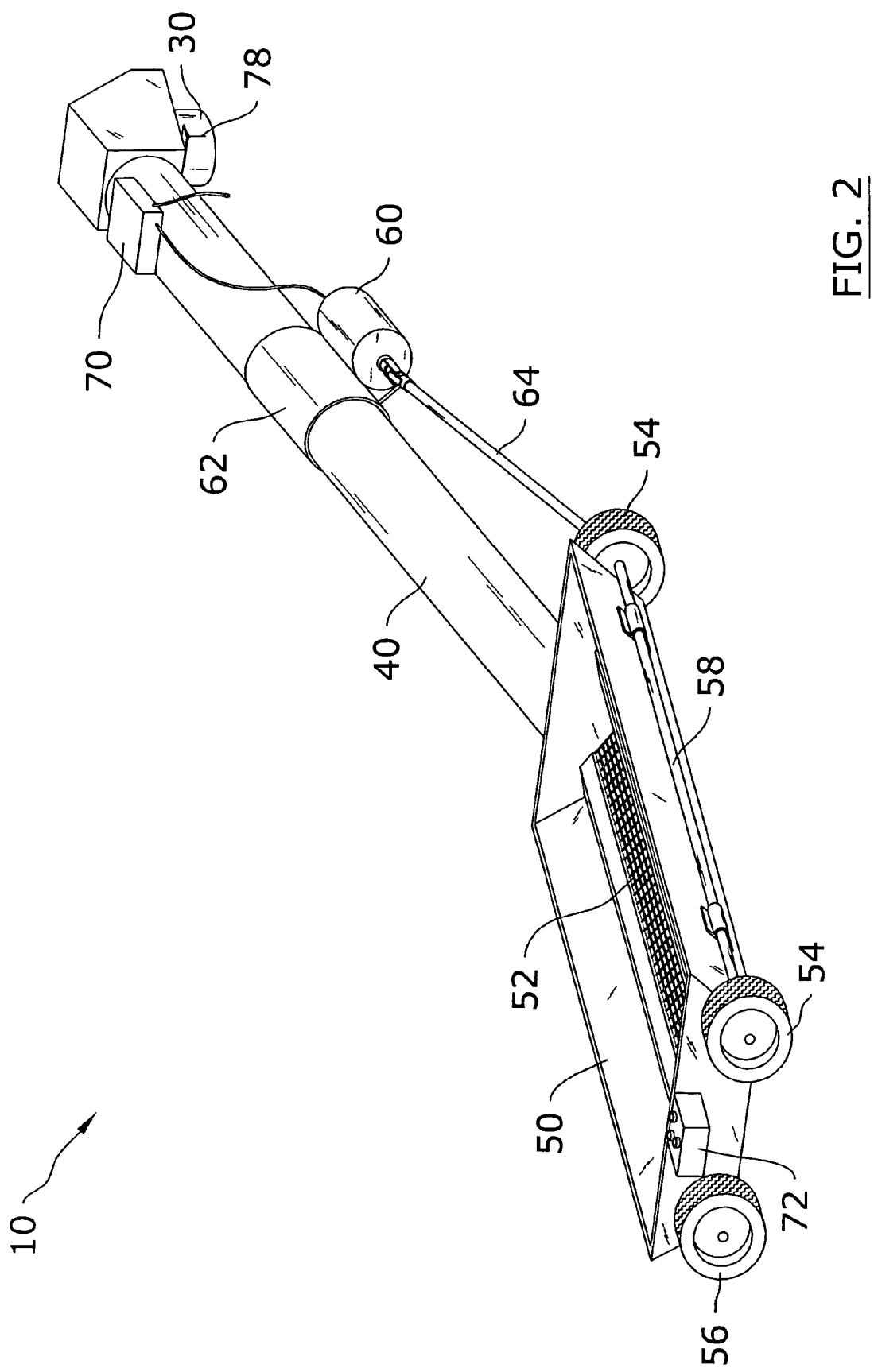
FIG. 2 is an upper perspective view of the present invention.
Figure 3:
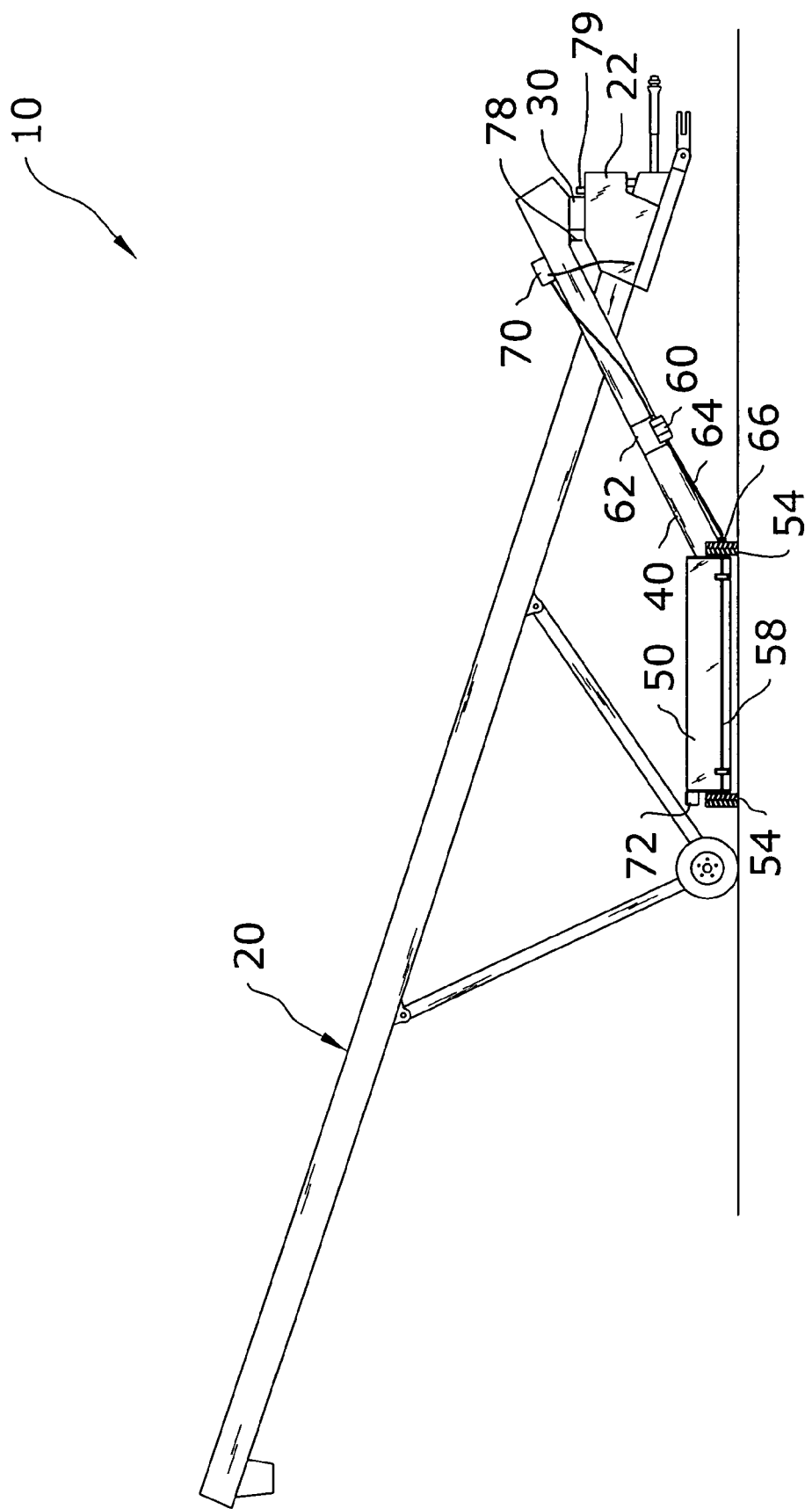
FIG. 3 is a front view of the present invention attached to a main auger.

Turning now descriptively to the drawings, in which similar reference characters denote similar elements throughout the several views, FIGS. 1 through 10 illustrate a remote controlled swing auger system 10, which comprises a swing auger 40 connectable to a main auger 20, a swing hopper 50 connected to the swing auger 40, a plurality of front wheels 54 and a plurality of rear wheels 56 rotatably attached to the swing hopper 50, a drive motor 60 mechanically connected to the front wheels 54, a control unit 70 in communication with the drive motor 60, and at least one controller in communication with the control unit 70. The controller may be comprised of a manual controller 72 and/or a remote controller 74. The user is able to pivot the swing hopper 50 with respect to a main auger 20 by using the remote controller 74 while in the tractor or in a remote location away from the augers.

B. Main Auger

FIGS. 1, 3, 5, 6 and 7 illustrate a conventional main auger 20. Various well known auger structures may be utilized to construct the main auger 20 that are capable of transporting particulate material (e.g. grain). The present invention is designed to be utilized upon various types of main augers 20 and should not be limited to the specific design of main auger 20 shown in FIGS. 1, 3, 5, 6 and 7.

C. Swing Auger

The swing auger 40 is connectable to the main auger 20 in a pivoting manner as shown in FIGS. 1, 3, 5, 6 and 7. The swing auger 40 may be comprised of any conventional swing auger 40 structure capable of transporting a particular material (e.g. grain).

Figure 4:
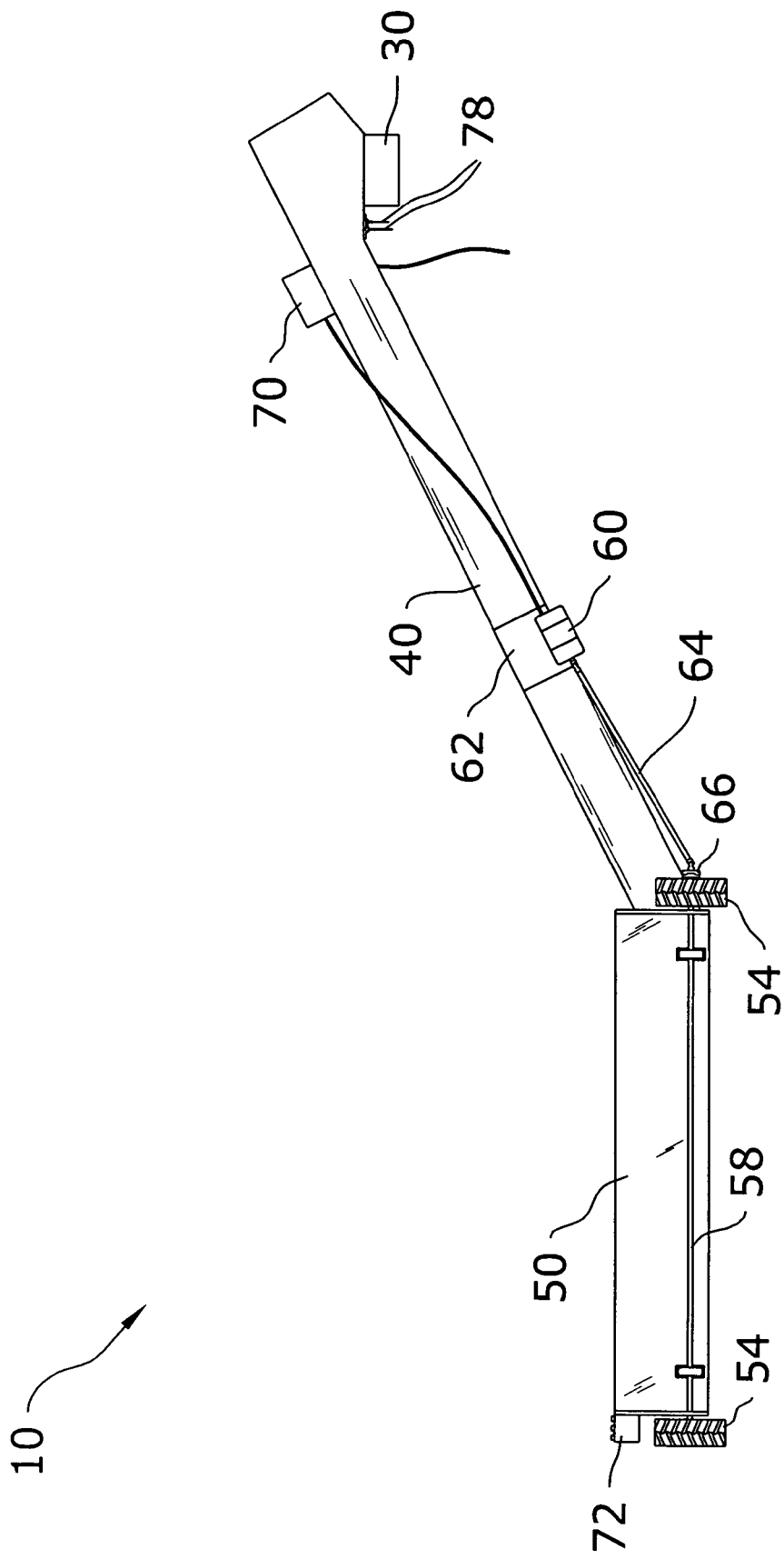
FIG. 4 is a front view of the present invention.
Figure 5:
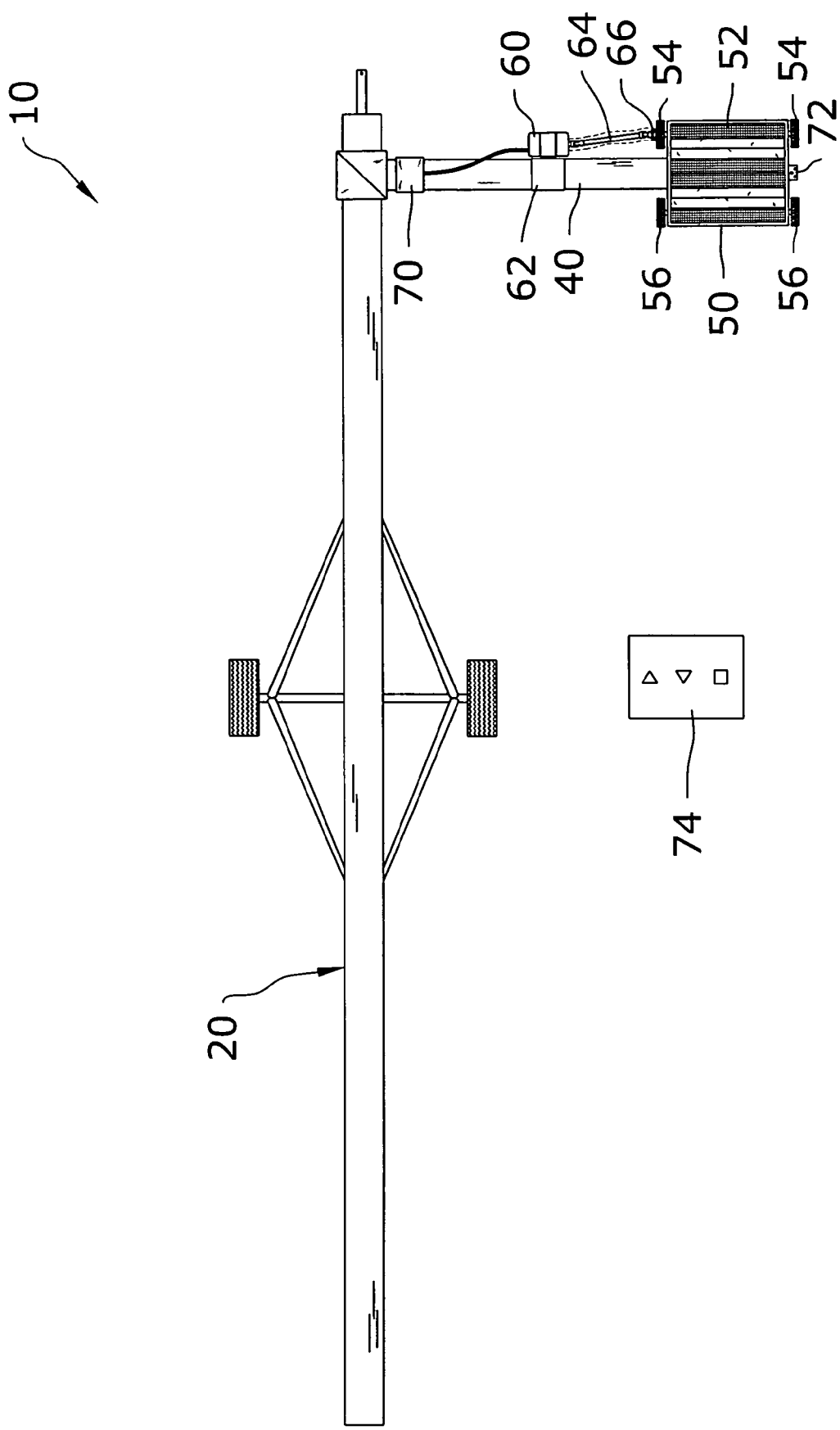
FIG. 5 is a top view of the present invention attached to a main auger.

A connecting chute 30 is preferably attached to an end of the swing auger 40 opposite of the swing hopper 50 as shown in FIG. 4 of the drawings. The connecting chute 30 is preferably capable of rotatably connecting to a connecting boot 22 of a main auger 20 which is also well known in the art of augers. Various other connecting structures may be utilized to pivotally connect the swing auger 40 to a main auger 20 as can be appreciated and the present invention should not be limited to the structure shown in the drawings.

D. Swing Hopper

The swing hopper 50 is connected to the swing auger 40 as shown in FIGS. 1 through 8 of the drawings. The swing hopper 50 may be comprised of any conventional hopper structure capable of collecting the particulate material from beneath a hopper trailer and the like. The swing hopper 50 may include a screen 52 as is well known in the art of swing augers 40.

Figure 6:
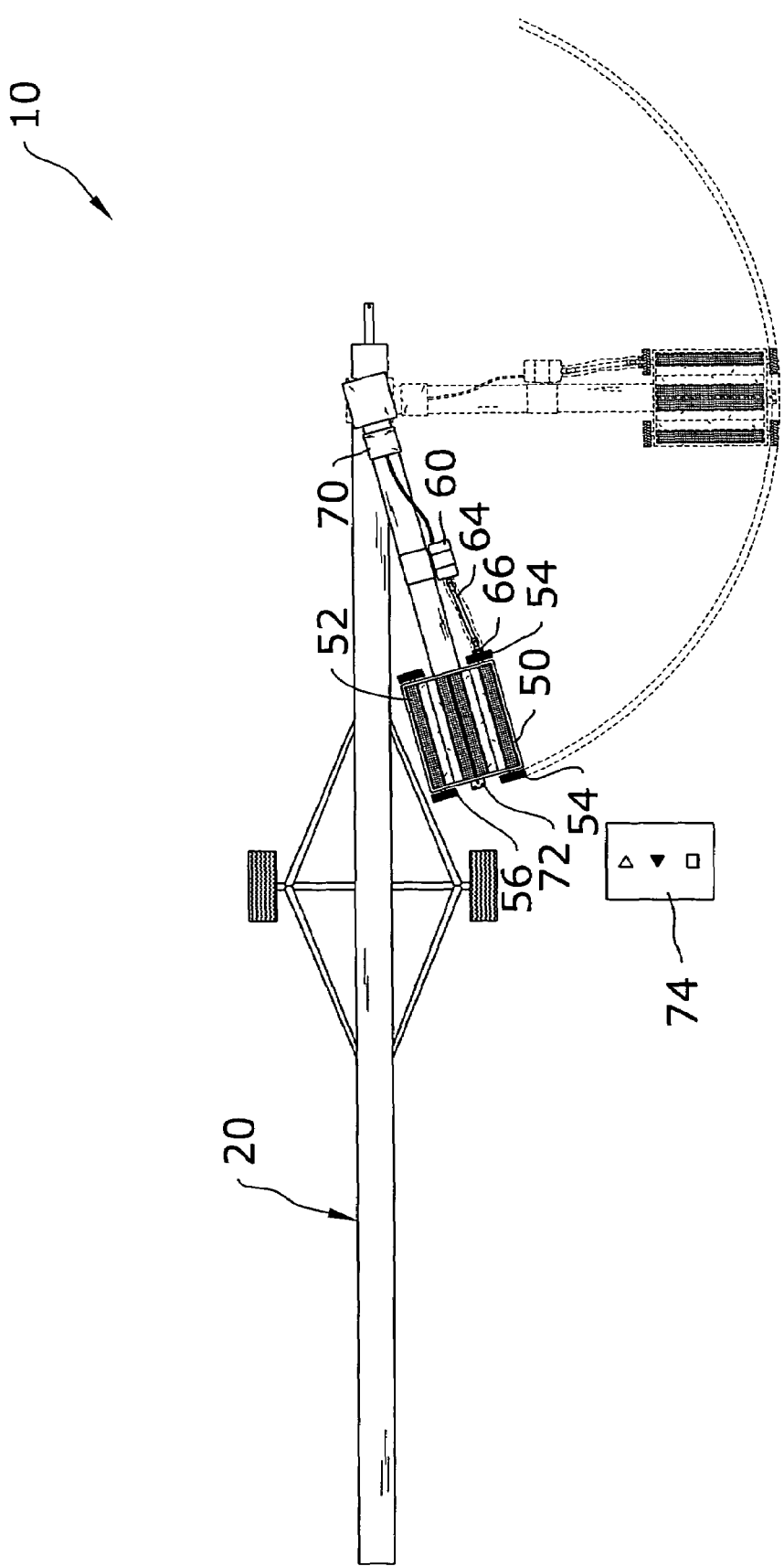
FIG. 6 is a top view of the present invention attached to a main auger and rotated with respect to the main auger in an inner position.
Figure 7:
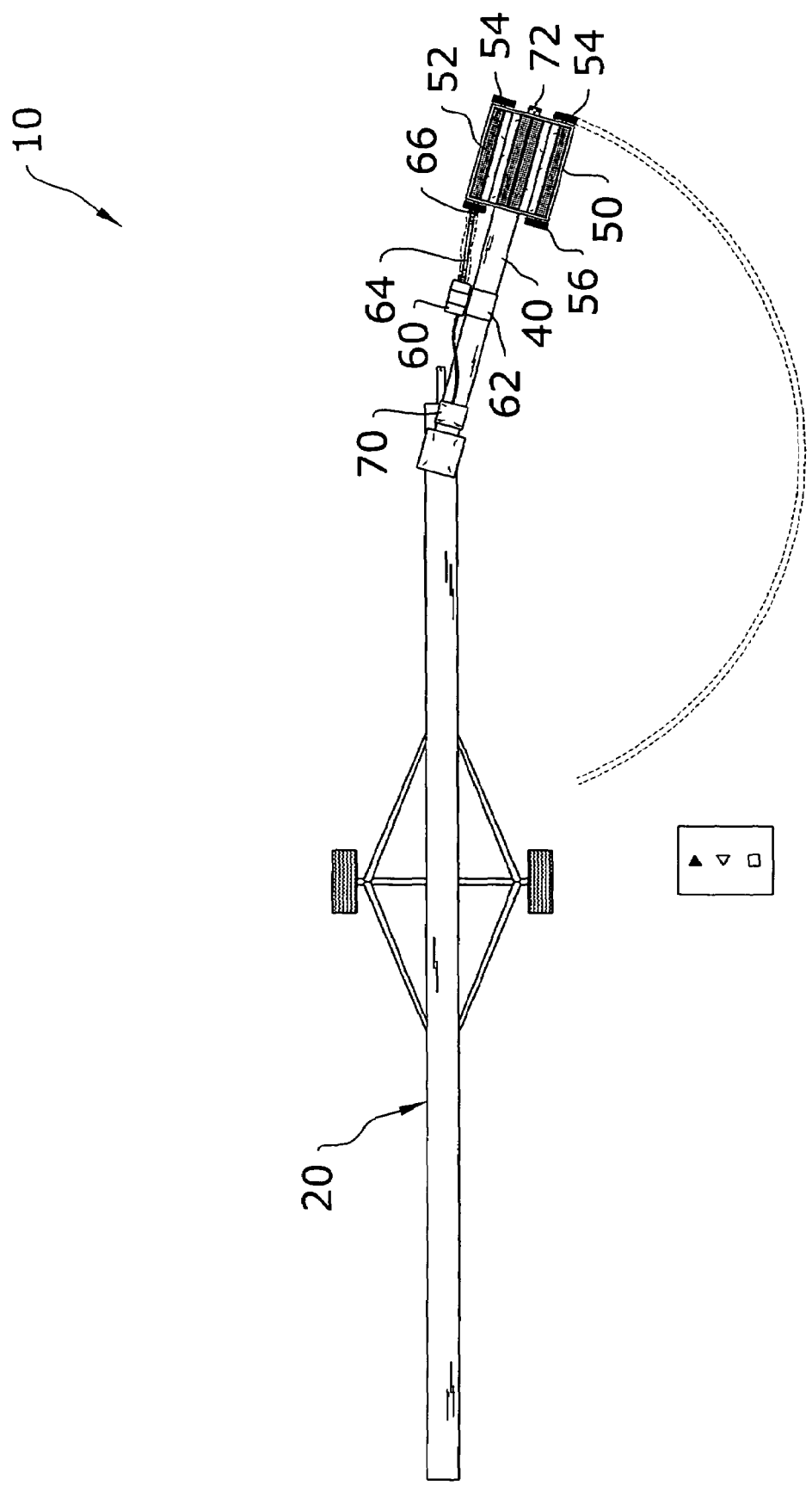
FIG. 7 is a top view of the present invention attached to a main auger and rotated with respect to the main auger in an extended position.

A plurality of front wheels 54 and a plurality of rear wheels 56 are rotatably attached to the swing hopper 50 as shown in FIGS. 1 through 8 of the drawings. The front wheels 54 are preferably mechanically connected to one another by a connecting shaft 58. The connection of the front wheels 54 together allows for the manipulation of one of the wheels which in turn rotates the other front wheel 54. The rotation of the front wheels 54 causes the pivoting of the swing hopper 50 and the swing auger 40 with respect to the main auger 20 as illustrated in FIGS. 6 and 7 of the drawings.

Figure 8:
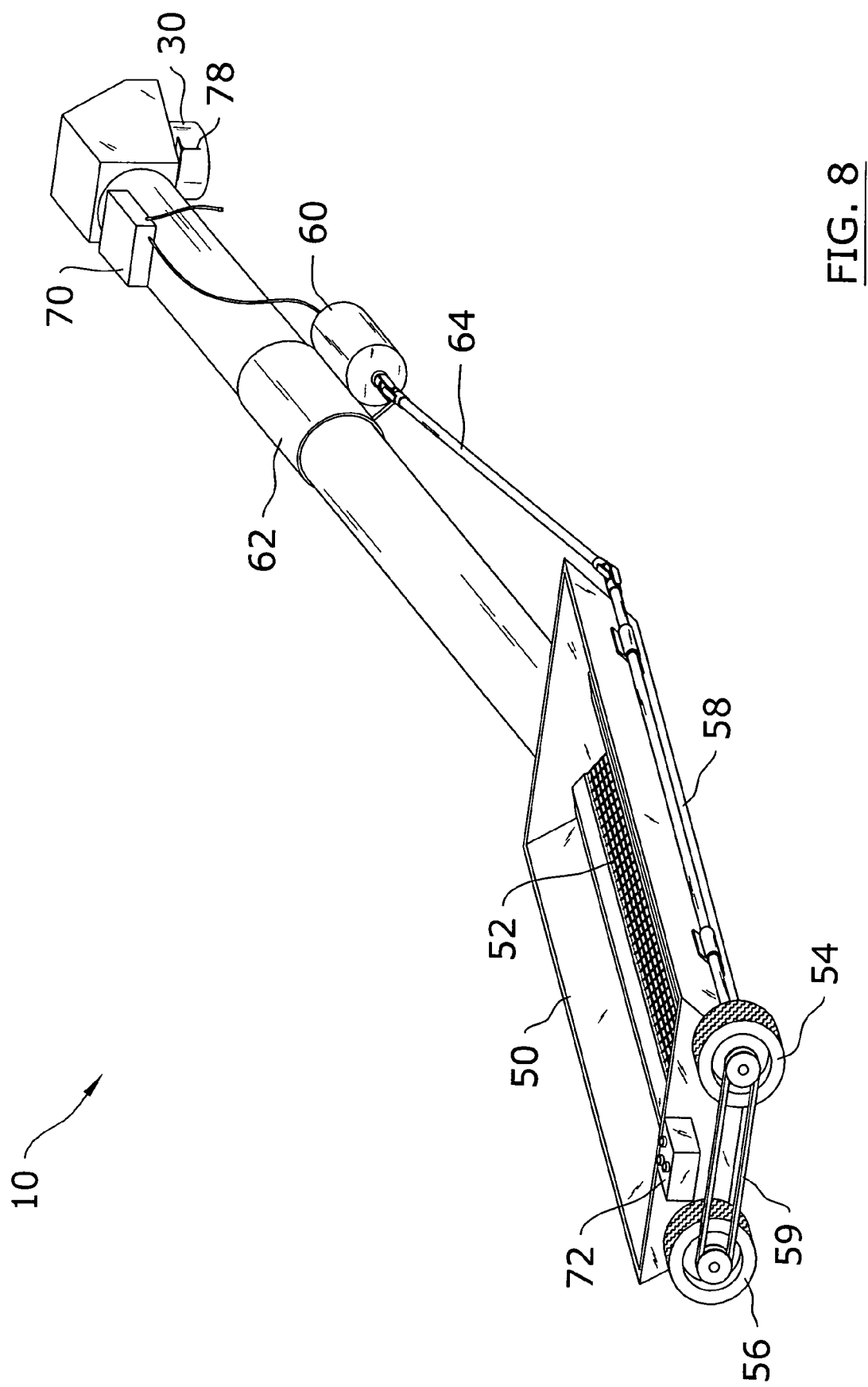
FIG. 8 is an upper perspective view of an alternative embodiment of the present invention with a connecting member mechanically connecting the front wheels and rear wheels.

The front wheels 54 are preferably mechanically connected to at least one of the plurality of rear wheels 56 by at least one connecting member 59 (e.g. chain, belt) as illustrated in FIG. 8 of the drawings. The rotation of the front wheels 54 in turn causes the rotation of the rear wheels 56 to drive the pivoting of the swing hopper 50 with respect to the main hopper.

E. Drive Motor

The drive motor 60 is mechanically connected to at least one of the front wheels 54 as shown in FIGS. 1, 2, 4 and 8 of the drawings. The drive motor 60 is preferably comprised of an electric motor that is electrically connectable to a power source 76 via a conventional power cord. The drive motor 60 may be attached to the swing auger 40 by a bracket 62 as shown in FIGS. 1 and 8 of the drawings. The drive motor 60 may also be attached to the swing hopper 50.

A drive shaft 64 is preferably mechanically connected between the drive motor 60 and one of the front wheels 54. The drive shaft 64 may include universal joints at each end to allow for the positioning of the drive motor 60 in various locations with respect to the swing hopper 50. A slip clutch 66 or similar device is preferably mechanically connected between the drive shaft 64 and the front wheels 54 to prevent rotation of the front wheels 54 if there is an obstruction of the swing hopper 50 or a malfunction of the control unit 70.

F. Control Unit

Figure 9:
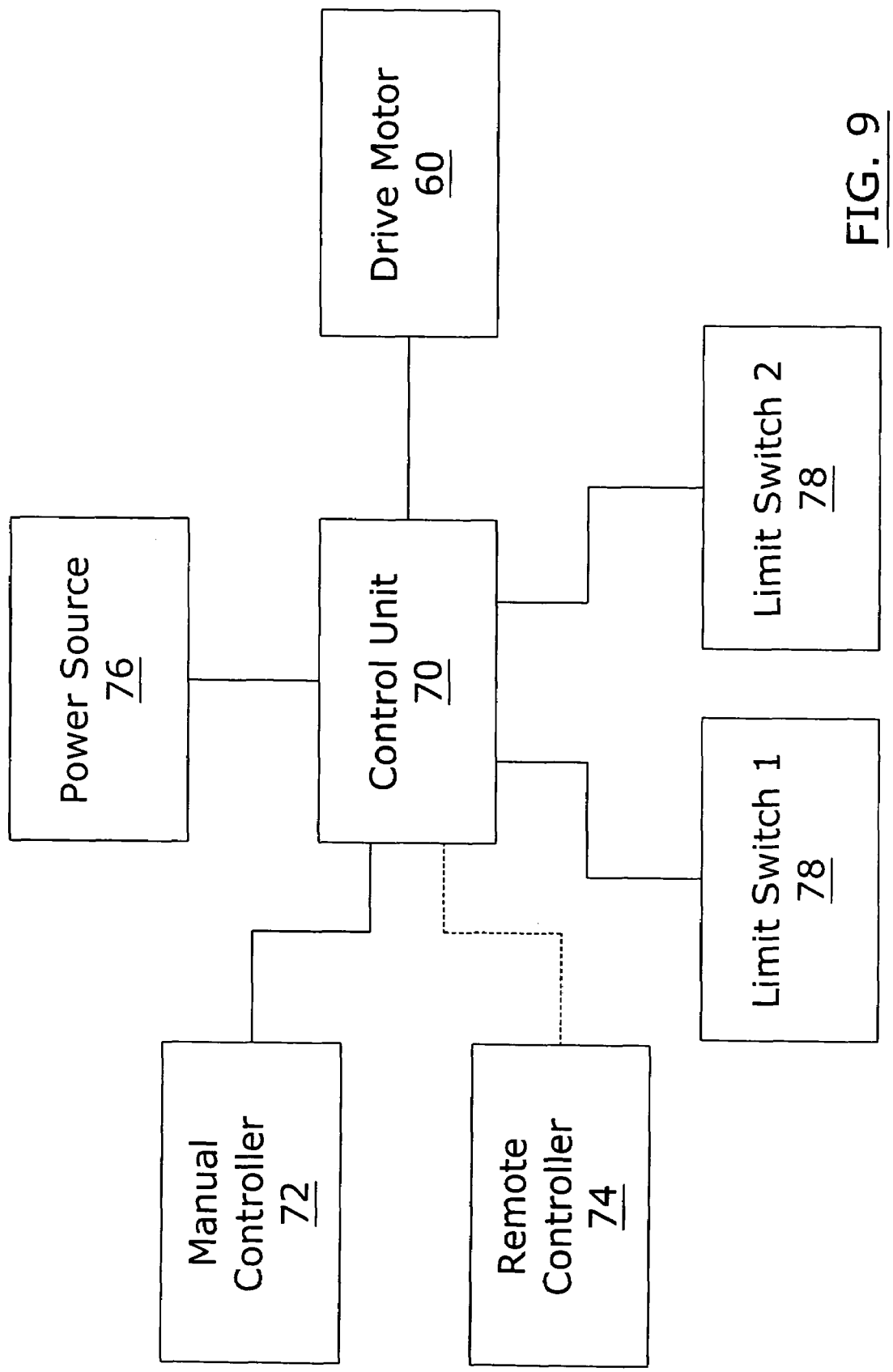
FIG. 9 is a block diagram of the present invention.
Figure 10:
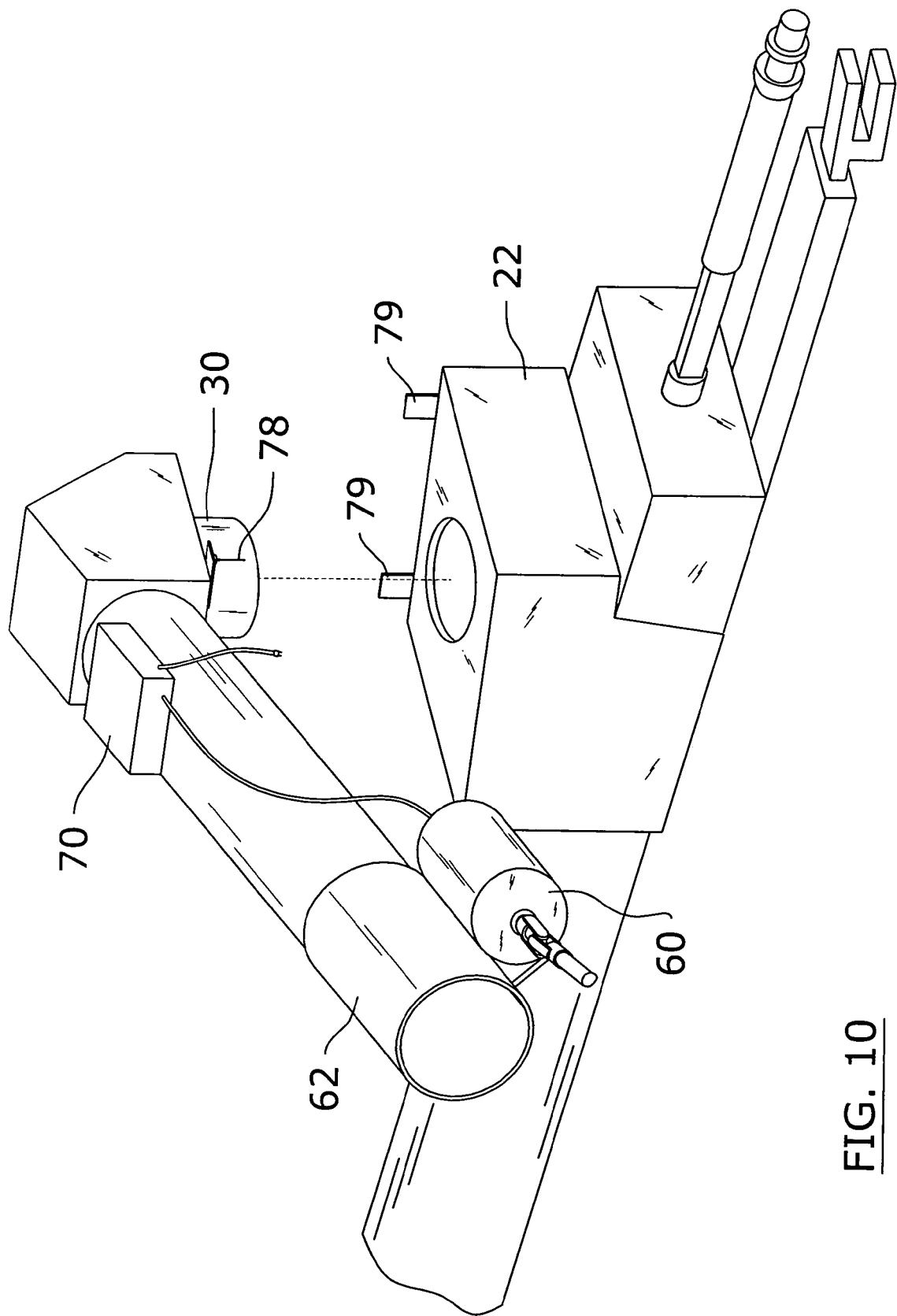
FIG. 10 is an exploded perspective view of the connection portion of the present invention illustrating the trigger members attached to the connecting boot.

The control unit 70 is in communication with the drive motor 60, the limit switch 78, the manual controller 72 and the remote controller 74 as shown in FIG. 9 of the drawings. The control unit 70 may be comprised of any device capable of controlling the rotation of the drive motor 60 (e.g. speed, rotational direction, etc.).

Two limit switches 78 are positioned upon the swing auger 40 for determining the position of the swing auger 40 with respect to the main auger 20 (on both sides of the main auger 20). A pair of corresponding trigger members 79 preferably extend from the connecting boot 22 for triggering the corresponding limit switch 78 if the swing auger 40 pivots too close to the main auger 20 to automatically shut off the drive motor 60. If the swing auger 40 passes a preset location, the limit switch 78 communicates the same to the control unit 70 so that the drive motor 60 may be terminated.

G. Controllers

A remote controller 74 is preferably in remote communication with the control unit 70 for controlling the operation of the drive motor 60 as shown in FIG. 9 of the drawings.

The remote controller 74 is preferably in remote communication with the control unit 70 via a radio signal or other remote communication system.

The remote controller 74 preferably includes two direction buttons that allow for the operator to control the clockwise or counter-clockwise movement of the swing hopper 50 with respect to the swing auger 40 as shown in FIGS. 5 through 8 of the drawings. The remote controller 74 further preferably includes a stop button to terminate operation of the drive motor 60.

A manual controller 72 is preferably electrically connected to the control unit 70 for controlling the drive motor 60 similar to the remote controller 74. The manual controller 72 is preferably attached to the swing hopper 50, but the manual controller 72 may be attached to the swing auger 40. The manual controller 72 preferably includes two direction buttons that allow for the operator to control the clockwise or counter-clockwise movement of the swing hopper 50 with respect to the swing auger 40. The manual controller 72 further preferably includes a stop button to terminate operation of the drive motor 60.

H. Operation of Invention

In use, the user positions a semi hopper trailer (or similar trailer) near the swing hopper 50 as shown in FIG. 6 of the drawings. The user then causes the swing hopper 50 and swing auger 40 to pivot outwardly with respect to the main auger 20 by manipulating the remote controller 74 (or the manual controller 72). The control unit 70 receives the control signal from the remote controller 74 and causes the drive motor 60 to rotate in the desired direction. The drive motor 60 in turn causes the front wheels 54 to rotate via the drive shaft 64 as shown in FIG. 1 of the drawings. The rotation of the front wheels 54 causes the swing hopper 50 to pivot with respect to the main auger 20 as shown in FIGS. 6 and 7 of the drawings. In the alternative embodiment shown in FIG. 8 of the drawings, the connecting member 59 is connected between one of the front wheels 54 and to one of the rear wheels 56 to cause rotation of the rear wheels 56.

The user unloads the particulate material with the swing auger 40 and the main auger 20 in operation which is well known in the art. After the load is removed from the semi hopper trailer, the user then uses the remote controller 74 to cause the swing hopper 50 to swing away from the semi hopper trailer to allow for the driver of the semi hopper trailer to drive away. The process may be repeated with the next load.

If the swing auger 40 rotates too far with respect to the main auger 20, one of the limit switches 78 will engage the corresponding trigger member 79 thereby signaling the control unit 70 to turn off the drive motor 60. This is a safety feature that prevents the swing auger 40 from pivoting into the main auger 20.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A remote controlled swing auger system, comprising:
   a swing auger connected to a main auger;
   a swing hopper connected to said swing auger;
   a plurality of front wheels and a plurality of rear wheels rotatably attached to said swing hopper;
   a drive motor mechanically connected to at least one of said front wheels;
   wherein said plurality of front wheels are mechanically connected to one another by a connecting shaft;
   wherein said plurality of front wheels are mechanically connected to at least one of said plurality of rear wheels by at least one connecting member;
   a control unit in communication with said drive motor; an at least one controller in communication with said control unit for controlling the operation of said drive motor.

2. The remote controlled swing auger system of claim 1, wherein said at least one controller is comprised of a manual controller and/or a remote controller.

3. The remote controlled swing auger system of claim 1, wherein said wherein said at least one controller is comprised of a remote controller, wherein said remote controller is in remote communication with said control unit.

4. The remote controlled swing auger system of claim 1, including a drive shaft mechanically connected between said drive motor and said at least one of said front wheels.

5. The remote controlled swing auger system of claim 4, including a slip clutch mechanically connected between said drive shaft and said at least one of said front wheels.

6. The remote controlled swing auger system of claim 1, wherein said drive motor is comprised of an electric motor.

7. The remote controlled swing auger system of claim 1, wherein said drive motor is attached to said swing auger by a bracket.

8. The remote controlled swing auger system of claim 1, wherein said connecting member is comprised of a chain.

9. The remote controlled swing auger system of claim 1, wherein said swing hopper includes a screen.

10. The remote controlled swing auger system of claim 1, including a connecting chute attached to an end of said swing auger opposite of said swing hopper, wherein said connecting chute is capable of rotatably connecting to a connecting boot of said main auger.

11. A remote controlled swing auger system, comprising:
    a swing auger connected to a main auger;
    a swing hopper connected to said swing auger;
    a plurality of front wheels and a plurality of rear wheels rotatably attached to said swing hopper;
    a drive motor mechanically connected to at least one of said front wheels;
    a drive shaft mechanically connected between said drive motor and said at least one of said front wheels;
    a slip clutch mechanically connected between said drive shaft and said at least one of said front wheels;
    a control unit in communication with said drive motor;
    a remote controller in remote communication with said control unit for controlling the operation of said drive motor.

12. The remote controlled swing auger system of claim 11, including a manual controller electrically connected to said control unit, wherein said manual controller is attached to said swing hopper.

13. The remote controlled swing auger system of claim 11, wherein said drive motor is comprised of an electric motor.

14. The remote controlled swing auger system of claim 11, wherein said drive motor is attached to said swing auger by a bracket.

15. The remote controlled swing auger system of claim 11, wherein said plurality of front wheels are mechanically connected to at least one of said plurality of rear wheels by at least one connecting member.

16. The remote controlled swing auger system of claim 15, wherein said connecting member is comprised of a chain.

17. The remote controlled swing auger system of claim 11, including a connecting chute attached to an end of said swing auger opposite of said swing hopper, wherein said connecting chute is capable of rotatably connecting to a connecting boot of said main auger.

18. A remote controlled swing auger system, comprising:
   a swing auger connected to a main auger;
   a swing hopper connected to said swing auger;
   a connecting chute attached to an end of said swing auger opposite of said swing hopper, wherein said connecting chute is rotatably connected to a connecting boot of said main auger;
   a plurality of wheels rotatably attached to said swing hopper;
   a drive motor mechanically connected to at least one of said plurality of wheels, wherein said drive motor is comprised of an electric motor;
   a drive shaft mechanically connected between said drive motor and said at least one of said plurality of wheels;
   a control unit in communication with said drive motor; an
   a remote control in communication with said control unit for controlling the operation of said drive motor;
   a first limit switch attached to said swing auger and in communication with said control unit for communicating to said control unit whether said swing auger passes a first preset location whereby said control unit deactivates said drive motor; and
   a second limit switch attached to said swing auger and in communication with said control unit for communicating to said control unit whether said swing auger passes a second preset location whereby said control unit deactivates said drive motor.

19. The remote controlled swing auger system of claim 18, wherein said remote control includes a first direction button to control said drive motor in a first direction, a second direction button to control said drive motor in a second direction and a stop button to terminate operation of said drive motor.

20. The remote controlled swing auger system of claim 18, wherein said remote control is in wireless communication with said control unit.

* * * * *